C. A. MILLER.
CASTER SPRING.
APPLICATION FILED JAN. 26, 1915.
1,144,771.
Patented June 29, 1915.
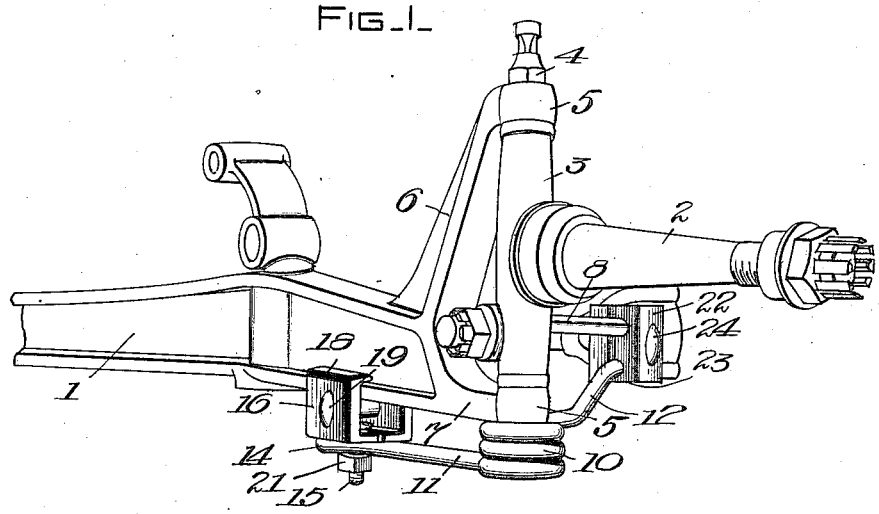
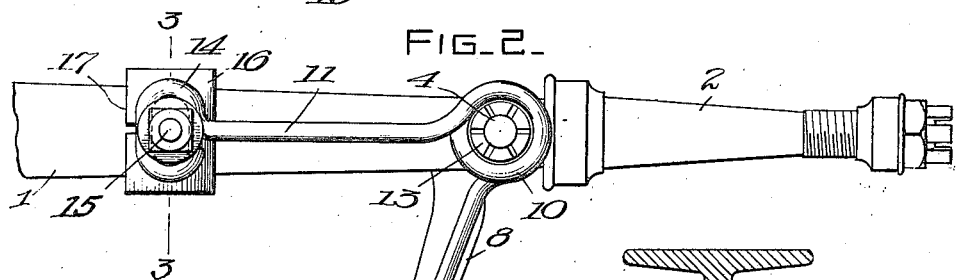
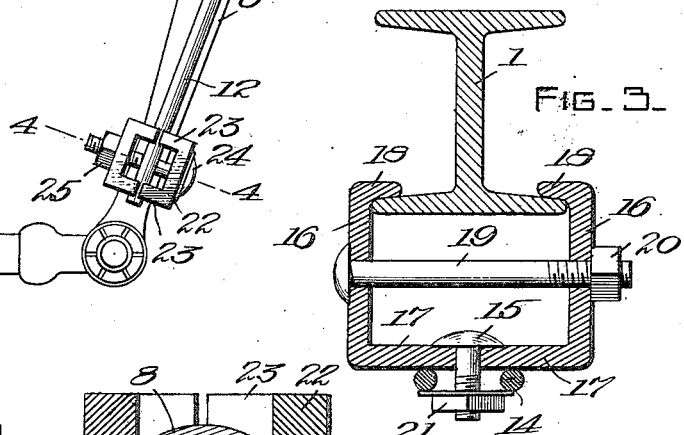
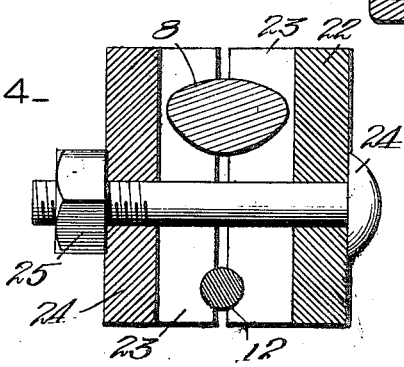
WITNESSES:
INVENTOR
Carmi A. Miller
BY Munn & Co.
ATTORNEYS

UNITED STATES PATENT OFFICE.

CARMI A. MILLER, OF SPRING VALLEY, ILLINOIS, ASSIGNOR OF ONE-HALF TO
J. FENTON MILLER, OF SPRING VALLEY, ILLINOIS.

CASTER-SPRING.

1,144,771. Specification of Letters Patent. Patented June 29, 1915.

Application filed January 26, 1915. Serial No. 4,469.

*To all whom it may concern:*

Be it known that I, CARMI A. MILLER, a citizen of the United States, and a resident of Spring Valley, in the county of Bureau and State of Illinois, have made certain new and useful Improvements in Caster-Springs, of which the following is a specification.

My invention is an improvement in caster springs and has for its object to provide a spring of the character specified, especially adapted for use with light motor vehicles and to be arranged between the front axle and the steering knuckle arms for normally holding the arms in normal position with respect to the axle in order to produce a caster effect on the steering wheels on the vehicle to cause the wheels to tend to travel in a straight line with the rear wheels.

In the drawings Figure 1 is a perspective view of one end of the front axle of a motor vehicle provided with the improved spring, Fig. 2 is a bottom plan view of Fig. 1, and Figs. 3 and 4 are sections on the lines 3—3 and 4—4, respectively, of Fig. 2.

The present embodiment of the invention is shown in connection with the front axle 1 of a motor vehicle, the said axle having at each end the usual spindle 2 having at its inner end the vertical sleeve 3 which fits over the steering knuckle bolt 4 between bearings 5 in the arms 6 and 7 of the fork at the end of the axle, the said bolt being journaled in the bearings. The steering knuckle arm 8 extends rearwardly from the sleeve 3 and the rod 9 is provided for connecting the steering knuckle arms, the usual steering mechanism being connected with the rod.

The improved spring is preferably of spring steel, properly oil tempered, and of suitable cross section and the spring comprises a coil 10 and arms 11 and 12 extending from the coil at an acute angle with respect to each other. The coil 10 is of a size to fit over the nut 13 of the steering knuckle bolt 4 and the arms 11 and 12 are designed to extend parallel with the axle and with the steering knuckle arm respectively, beneath the said axle and arm. The free end of the arm 11 is provided with an open loop or eye 14, and the said loop or eye is designed to engage over a bolt 15 which is connected to the axle in a manner to be described.

The bolt is connected to the axle 1 which is of the usual I-beam construction by means of similar clamping members, each consisting of a body 16, a lower flange 17, and an upper flange 18. The clamping members are oppositely arranged and the bolt is held between the adjacent edges of the flanges 17 of the clamping members. The clamping members are arranged with the flanges 18 engaging over the lower horizontal portion of the I-beam, and the body 16 of the clamping members have registering openings between the flanges 17 and 18 for receiving a bolt 19. The bolt is passed transversely of the axle through the openings in the bodies of the clamping members and the bolt is engaged by a nut 20 to clamp the clamping members on the bolt 15 and on the I-beam. A nut 21 is arranged on the bolt 15 below the eye or loop 14 for clamping the said eye or loop against the outer faces of the flanges 17.

The arm 12 of the spring extends rearwardly beneath the steering knuckle arm and the rear end thereof is offset upwardly and is clamped to the arm by means of oppositely arranged clamping members. Each of the said members is channel shaped, consisting of a body 22 and side walls 23 at the side edges of the body, and the bodies are held in clamping position by means of a bolt 24 and a nut 25, the bolt being passed through registering openings in the bodies and being engaged by the nut on the opposite side of the bodies from the head of the bolt. The flanges 23 of the clamping members are recessed above and below the bolt to form coöperating openings for receiving the arm 12 of the spring and the steering knuckle arm 8, the steering arm being above the bolt and the spring arm below. Thus the nut 25 and the bolt 24 firmly clamp the clamping members on the arms 8 and 12.

The provision of the coil 10 in the spring arranged between the arms 11 and 12 permits the arm 12 to be alined with the steering knuckle arm, whatever the position of the arm.

The improvement is especially designed for use with light cars using the reversible rack and pinion, or any other type of reversible steering gear. In such cars there is a tendency of the front wheels to be deflected from their true course by irregularities or obstructions in the road, such as rocks, lumps of snow or ice, mud, or the like, and should the driver not have a firm grip on the steering wheel at such times accidents frequently result.

A very slight deflection of the steering wheels when the vehicle is traveling swiftly may cause a wide departure from the true course of the vehicle. It is a fact that when traveling over a rutted road, the driver will, as a rule, follow the ruts with the front wheels instead of holding them true with the rear wheels. When the front wheels are true with the rear wheels there is but a slight chance of skidding, but should the wheels be bearing to the right or left from the true course, and should they at this time strike a place where they may jump or deflect from the roads, the car will be in the ditch or cross-ways of the road before it can be stopped.

With the improved caster springs, however, the driver will be warned at the instant when the front wheels leave a true course by the pull of the springs as they are moved from neutral position. The improved springs, while they will hold the front wheels to the true course in alinement with the rear wheels, yet they will not interfere with the easy steering. In addition the springs are noiseless in operation and they cannot be put out of commission by accumulations of mud or snow. The springs tend not only to hold the wheels to their true course, but to return the wheels to the true course after they have been turned to change the direction of motion of the vehicle. The springs also take up any lost motion in the steering mechanism. On ordinary smooth roads the springs could be relied upon to hold the vehicle to its course.

It will be noticed that the loop or eye 14 is elliptical and this provides for some adjustment. In the manufacture of the springs there is always a possible chance that the relative angle of the arms 11 and 12 may differ slightly. Therefor, if the arms 11 and 12 do not hold the same relative angle to each other that obtains between the knuckle arm 8 and the axle 1, the invention might not perform all of its functions. With the elliptical or oblong eye 14 should there be a difference between these angles, as above mentioned, the loop or eye 14 will not be tightened to the axle until the arm 11 is in the proper position with respect to the axle and other parts. For instance in placing the springs, the front and rear wheels are lined up and the coil 10 of each spring is placed over the nut 13 and the arm 12 is clamped to the steering knuckle arm. With the wheels exactly alined, the arm 11 will take its normal position with respect to the axle, since the loop or eye 14 is not yet clamped to the axle. Immediately, however, that the wheels are alined, as above stated, the arm may be clamped to the axle, and the parts will hold their proper position.

I claim:

1. In combination with the front axle of a motor vehicle, the spindle, the steering knuckle bolt for pivotally connecting the spindle to the axle, the nut engaging the bolt, and the steering knuckle arm extending rearwardly from the spindle and bolt, of a spring for normally holding the spindle and the knuckle arm in neutral position, said spring comprising a coil fitting over the nut of the bolt, arms extending approximately parallel with the axle and with the steering knuckle arm, releasable clamping means for connecting each arm to the axle or to the steering knuckle arm, each of the said clamping means comprising channel-shaped sections arranged with their channels adjacent and having registering openings, a bolt passing through the openings of the sections of each of the said means, a nut engaging each bolt, the side walls of the sections adjacent to the knuckle arm being recessed to receive the knuckle arm and the spring arm, the side walls of the sections at the axle engaging the axle at one side edge of the sections, a bolt clamped between the flanges at the other side edge of the sections, the spring arm having an eye for engaging the bolt, and a nut on the bolt for clamping the eye to the flanges.

2. In combination with the front axle of a motor vehicle, the spindle, the steering knuckle bolt for pivotally connecting the spindle to the axle, the nut engaging the bolt, and the steering knuckle arm extending rearwardly from the spindle and bolt, of a spring for normally holding the spindle and the knuckle arm in neutral position, said spring comprising a coil fitting over the nut of the bolt, arms extending approximately parallel with the axle and with the steering knuckle arm, releasable clamping means for connecting each arm to the axle or to the steering knuckle arm, each of the said clamping means comprising channel-shaped sections arranged with their channels adjacent and having registering openings, a bolt passing through the openings of the sections of each of the said means, and a nut engaging each bolt.

3. In combination with the front axle of a motor vehicle, the spindle, the steering knuckle bolt for pivotally connecting the spindle to the axle, the nut engaging the bolt, and the steering knuckle arm extending rearwardly from the spindle and bolt, of a spring for normally holding the spindle and the knuckle arm in neutral position, said spring comprising a coil fitting over the nut of the bolt, arms extending approximately parallel with the axle and with the steering knuckle arm, and releasable clamping means for connecting each arm to the axle or to the steering knuckle arm.

4. A spring for connection with the front axle of a motor vehicle for holding the spindle in normal position with respect to the axle, said spring comprising a coil adapted to fit over the nut of the steering knuckle bolt, arms extending from the opposite ends of the coil at an acute angle with respect to each other and adapted to extend beneath the axle and the knuckle arm and to be tamped to the axle and the arm, the arm for connection with the axle having a loop or eye at its free end.

5. A spring for connection with the front axle of a motor vehicle for holding the spindle in normal position with respect to the axle, said spring comprising a coil adapted to fit over the nut of the steering knuckle bolt, arms extending from the opposite ends of the coil at an acute angle with respect to each other and adapted to extend beneath the axle and the knuckle arm and to be clamped to the axle and the arm.

6. In a motor vehicle, the combination with the front axle, the spindles pivoted to the ends thereof, and the steering knuckle arms extending rearwardly from the spindles, of arms arranged at an angle with respect to each other and connected by a spring, means for clamping one of the arms to the steering knuckle arm, and means for clamping the other arm to the axle, said last named clamping means being adjustable transversely of the said arm.

CARMI A. MILLER.

Witnesses:
CHARLES W. KNAPP,
PETER HANNUH, Jr.